(12) United States Patent
Okada et al.

(10) Patent No.: US 8,470,213 B2
(45) Date of Patent: Jun. 25, 2013

(54) METHOD FOR EXTRUSION-MOLDING LOOSE TUBE AND APPARATUS THEREFOR, AND LOOSE TUBE

(75) Inventors: Naoki Okada, Yotsukaido (JP); Yoshio Hashimoto, Sakura (JP); Masayuki Ishioka, Yachimata (JP)

(73) Assignee: Fujikura Ltd., Tokyo (JP)

( * ) Notice: Subject to any disclaimer, the term of this patent is extended or adjusted under 35 U.S.C. 154(b) by 299 days.

(21) Appl. No.: 12/741,500

(22) PCT Filed: Oct. 29, 2008

(86) PCT No.: PCT/JP2008/069677
§ 371 (c)(1),
(2), (4) Date: May 5, 2010

(87) PCT Pub. No.: WO2009/060768
PCT Pub. Date: May 14, 2009

(65) Prior Publication Data
US 2010/0247045 A1    Sep. 30, 2010

(30) Foreign Application Priority Data
Nov. 9, 2007  (JP) .................................. 2007-291894

(51) Int. Cl.
*G02B 6/04* (2006.01)
*B29D 11/00* (2006.01)
*B32B 1/00* (2006.01)
*B29C 47/12* (2006.01)

(52) U.S. Cl.
USPC ................... 264/1.28; 264/1.29; 264/171.13; 425/114; 425/131.1; 425/463

(58) Field of Classification Search
USPC ............... 385/109–114; 425/114, 131.1, 463; 264/1.28, 1.29, 171.13; 118/123, 125, 405, 118/420, 602
See application file for complete search history.

(56) References Cited

U.S. PATENT DOCUMENTS

| 5,312,499 A | 5/1994 | Bolick et al. |
| 5,395,557 A | 3/1995 | Griser et al. |

(Continued)

FOREIGN PATENT DOCUMENTS

| CN | 200967269 Y | 10/2007 |
| JP | 58-087030 A | 5/1983 |

(Continued)

OTHER PUBLICATIONS

Australian Office Action issued in Application No. 2008325787, dated Feb. 11, 2011.

(Continued)

*Primary Examiner* — Uyen Chau N Le
*Assistant Examiner* — Michael Mooney
(74) *Attorney, Agent, or Firm* — Sughrue Mion, PLLC

(57) ABSTRACT

An extrusion-molding apparatus for a loose tube includes: an extrusion head that includes a tip and a die concentrically arranged therewithin and extrudes a tube between the tip and the die; a needle that feeds at least one optical fiber and filler to be filled around the optical fiber into the tube being extrusion-molded; and a cylindrical bundling member provided within the needle. The bundling member has a bundling hole being smaller than an inner diameter of the tube at a center thereof and into which the optical fiber can pass through, and a flow pass penetrating along a feeding direction of the filler between the bundling hole and an inner circumferential surface of the needle. In an extrusion molding method using the extrusion-molding apparatus, the optical fiber is passed through a bundling hole to be bundled at an almost center of the tube. In addition, filler is passed through a flow path to be filled around the optical fiber.

6 Claims, 5 Drawing Sheets

U.S. PATENT DOCUMENTS 5,601,646 A    2/1997   Gardner et al.
5,744,194 A    4/1998   Muller et al.

FOREIGN PATENT DOCUMENTS

| | | |
|---|---|---|
| JP | S59-109731 U | 7/1984 |
| JP | 2510872 Y2 | 9/1996 |
| JP | 08-259272 A | 10/1996 |
| JP | 2002-192591 A | 7/2002 |
| JP | 2003-140014 A | 5/2003 |
| JP | 2004-302373 A | 10/2004 |

OTHER PUBLICATIONS

Supplementary European Search Report dated Apr. 12, 2012 issued in European Application No. 08847901.9.

Office Action issued by the Japanese Patent Office in Japanese Application No. 2007-291894 dated Dec. 19, 2012.

Office Action issued by Japanese Patent Office in Japanese Application No. 2007-291894 dated Feb. 26, 2013.

METHOD FOR EXTRUSION-MOLDING LOOSE TUBE AND APPARATUS THEREFOR, AND LOOSE TUBE

TECHNICAL FIELD

The present invention relates to a method for extrusion-molding a loose tube and an apparatus therefor, and a loose tube. Especially, the present invention relates to a method for extrusion-molding a loose tube and an apparatus therefor for preventing an optical fiber(s) from contacting with a high-temperature tube just extruded and thermally insulating by interposing gel (filler) between the tube and the optical fiber(s), and relates to a loose tube with a high-quality and high-density packaging structure that can make a diameter of the tube smaller and provide good transmission characteristics.

BACKGROUND ART

As shown in FIG. 7 and FIG. 8, a loose-tube type optical fiber cable 101 is conventionally configured by bundling plural loose tubes 103 around a center tension member 105 with SZ twisting. A thin film 107 is sheathed around the bundled loose tubes 103. Further, a PE sheath 109 is provided around the thin film 107 as an outer sheath. Such a configuration of the loose-tube type optical fiber cable 101 is most commonly-used.

In addition, as shown in FIG. 9, the loose tube 103 is configured by accommodating plural optical fibers 111 within a tube (made of thermoplastic resin such as PBT resin) 113. Gel (jelly: filler: waterproof material) is filled within the tube 113. For example, an outer diameter of the tube is made 2.2 mm and an inner diameter thereof is made 1.4 mm, and the twelve optical fibers 111 are accommodated therewithin.

As shown in FIG. 10, in a conventional extrusion-molding apparatus for a loose tube, a needle 121, a tip 123 and a die 125 are to be concentrically arranged within a tube extrusion-molded in a extrusion head 119. The needle 121 feeds out the optical fibers 111 and the gel 115 to be filled around the optical fibers 111. The tip 123 and the die 125 extrusion-mold the tube 113 that is to accommodate the optical fibers 111 and the filler 115. The tube 113 is molded by injecting resin 127 through a circular flow path between the tip 123 and the die 125. In parallel, the optical fibers 111 and the gel 115 to be accommodated within the tube 113 are fed into the tube 113 through the needle 121.

In addition, in after-mentioned patent Documents 1 and 2, extrusion molding methods of a loose tube is disclosed. In these molding methods, an inner diameter of a die for bundling optical fibers in upstream of a needle is made smaller than that of the needle. In addition, gel is filled so as to function as thermal insulator between the optical fibers and the loose tube.

For example, describing the Patent Document 1, the optical fibers are being unbundled at an inlet of a cavity (portion filled with the gel), and fed into a spline member that bundles the optical fibers at an outlet of the cavity. On an outer circumferential surface of the spline member, slots are formed so as to flow the gel therethrough. Since the spline member is pressed onto a housing, it is presumed that an inner diameter of the housing is large enough not to oppilate the slots in order to flow the gel through. As described above, the bundled optical fibers are suffused around with the gel by making an opening diameter of the spline member (die) smaller than an inner diameter of the gel needle. As a result, heats affecting the optical fibers are relaxed by the gel layer while the optical fibers run through the needle in the extrusion head.

Patent Document 1: U.S. Pat. No. 5,395,557
Patent Document 1: U.S. Pat. No. 5,601,646 (Japanese Patent Application Laid-open No. H9-101442)

DISCLOSURE OF THE INVENTION

Recently, it is desired that more of the optical fibers 111 are packaged within the tube 113 having a small diameter in order to improve cable laying operations and reduce costs. Therefore, the inner diameter of the needle 121 becomes relatively large to that of the tube 113 to be molded. As a result, as shown in an XI portion in FIG. 11 and a XII portion in FIG. 12, there is a case where the optical fibers 111 may be contacted and caught up with molten PBT resin just extruded to form the tube 113. Later, surplus length of the contacted optical fibers 111 grows, as shown in FIG. 13, when the PBT resin of the tube 113 cools down and shrinks.

In the Patent Documents 1 and 2, it is aimed to improve filling density of the gel within the tube, to prevent air bubbles from entraining, and to decrease heating of the optical fibers in the extrusion head. They focuses on preventing adhesion among the optical fibers and heating of the optical fibers in the extrusion head by filling the gel more among the optical fiber. Therefore, the above aims will be accomplished, but there is concern that the optical fibers may be contacted with the molten tube.

For example, describing based on the Patent Document 1, the spline member for bundling the optical fibers is attached to the outlet of the cavity (portion filled with the gel). The bundled optical fibers and the gel are fed out into the tube through an inside of the long needle. It is important to produce with keeping the bundled optical fibers at the center of an extrusion cone of (the extruded tube in) the extrusion head. However, the spline member is located at the outlet of the cavity that is provided upstream of the needle, thus a distance between the spline member, and the die and tip of the extrusion head. Therefore, precision to keep the bundled optical fibers at the center of the tube is not so good. In other words, there is concern that the optical fibers may be contacted with the molten tube (phenomenon shown in FIG. 13).

An object of the present invention is to produce a loose tube with a high-quality and high-density packaging structure by preventing an optical fiber(s) from contacting with a high-temperature tube just extruded.

The present invention is a method for extrusion-molding a loose tube using an extrusion-molding apparatus that includes an extrusion head that includes a tip and a die concentrically arranged therewithin and extrudes a tube between the tip and the die, and a needle that feeds at least one optical fiber and filler to be filled around the optical fiber into the tube being extrusion-molded. The optical fiber is passed through a bundling hole that is formed at a center of a bundling member provided within the needle and has an inner diameter smaller than an inner diameter of the tube, and bundled the optical fiber at an almost center of the tube. In addition, the filler is passed through a flow path that is provided between the bundling hole and an inner circumferential surface of the needle, and filled around the optical fiber.

According to the method for extrusion-molding a loose tube of the present invention, since the optical fiber is bundled at the almost center of the tube, the optical fiber can be prevented from contacting with the high-temperature tube just extruded. In addition, since the filler is filled around the bundled optical fiber(s), the filler insulates high heat from the tube, and thereby produced can be a loose tube with a high-quality and high-density packaging structure that can make a diameter of the tube smaller. Furthermore, by using the loose tube, cable laying operations can improved and costs can be reduced.

Here, it is preferable that a guide member is provided upstream of the bundling member along a feeding direction of the filler in the extrusion-molding apparatus, a guide hole being formed at a center of the guide member, being larger than the bundling hole, and having an inner diameter smaller than a length twice as a distance from the center of the bundling member to the flow path, and the optical fiber is introduced into the bundling hole with being guided by the guide hole.

Alternatively, it is preferable that a step is provided upstream of the bundling member along a feeding direction of the filler in the extrusion-molding apparatus, a guide hole being formed along a center axis of the needle by the step, being larger than the bundling hole, and having an inner diameter smaller than a length twice as a distance from the center of the bundling member to the flow path, and the optical fiber is introduced into the bundling hole with being guided by the guide hole.

Here, it is preferable that a cavity that is filled with the filler to be fed into the needle is provided on an upstream side of the needle, and a plurality of the optical fibers in a bundled state is introduced into the cavity and then introduced into the needle. In this case, since the optical fibers are not unbundled at an inlet of the cavity, contact resistance applying to the optical fibers can be reduced. In addition, it is further preferable that the bundling member is provided within the extrusion head. Due to this, a distance between the bundling member and the extrusion position of the tube in the extrusion head is made shortened; thereby the optical fibers can be introduced to the center of the extruded tube with a high degree of accuracy.

An extrusion-molding apparatus for a loose tube according to the present invention includes an extrusion head that includes a tip and a die concentrically arranged therewithin and extrudes a tube between the tip and the die; a needle that feeds at least one optical fiber and filler to be filled around the optical fiber into the tube being extrusion-molded; and a cylindrical bundling member provided within the needle. The bundling member has a bundling hole being smaller than an inner diameter of the tube at a center thereof and into which the optical fiber can pass through, and a flow pass penetrating along a feeding direction of the filler between the bundling hole and an inner circumferential surface of the needle.

According to the extrusion-molding apparatus for a loose tube of the present invention, similarly to the advantages of the above-described production method, the optical fiber is bundled at the almost center of the tube. Therefore, the optical fiber can be prevented from contacting with the high-temperature tube just extruded. In addition, since the filler is filled around the bundled optical fiber(s) from the flow path provided around the bundling hole, the filler insulates high heat from the tube, and thereby produced can be a loose tube with a high-quality and high-density packaging structure that can make a diameter of the tube smaller. Furthermore, by using the loose tube, cable laying operations can improved and costs can be reduced.

Here, it is preferable that the extrusion-molding apparatus further comprises: a cylindrical guide member provided upstream of the bundling member along the feeding direction within the needle, and a guide hole is formed at a center of the guide member and larger than the bundling hole and has an inner diameter smaller than a length twice as a distance from the center of the bundling member to the flow path.

Alternatively, it is preferable that the extrusion-molding apparatus further comprises: a step provided upstream of the bundling member along the feeding direction on an inner wall surface of the needle, and a guide hole is formed at a center of the step and larger than the bundling hole and has an inner diameter smaller than a length twice as a distance from the center of the bundling member to the flow path.

Here, it is preferable that the extrusion-molding apparatus further comprises: a cavity filled with the filler to be fed into the needle on an upstream side of the needle, and the cavity is configured to introduce a plurality of the optical fibers in a bundled state therewithin and then feed out into the needle. In this case, since the optical fibers are not unbundled at an inlet of the cavity, contact resistance applying to the optical fibers can be reduced. In addition, it is further preferable that the bundling member is provided within the extrusion head. Due to this, a distance between the bundling member and the extrusion position of the tube in the extrusion head is made shortened; thereby the optical fibers can be introduced to the center of the extruded tube with a high degree of accuracy.

A loose tube according to the present invention, includes a tube made of extrusion-molded resin; at least one optical fiber accommodated in a bundled state at an almost center of the tube; and filler filled between the optical fiber and an inner wall surface of the tube.

According to the loose tube of the present invention, since at least one optical fiber is bundled at the almost center of the tube and the optical fiber is insulated from the tube by the filler around the optical fiber, achieved can be a high-quality and high-density packaging structure that can make a diameter of the tube smaller and provide good transmission characteristics. Furthermore, by using the loose tube, cable laying operations can improved and costs can be reduced.

BEST MODE(S) FOR CARRYING OUT THE INVENTION

Hereinafter, embodiments according to the present invention will be described below with reference to the drawings.

Figure 1:
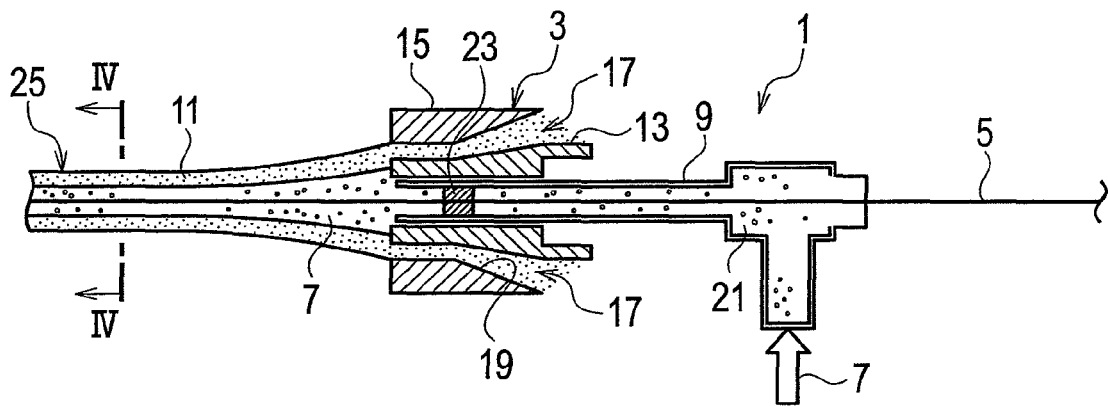
[FIG. 1] is a schematic cross-sectional view of a first embodiment of an extrusion-molding apparatus for a loose tube according to the present invention.

As shown in FIG. 1, in an extrusion-molding apparatus 1 for a loose tube according to a first embodiment, a needle 9, a tip 13 and a die 15 are provided within an extrusion head 3 with concentrically arranged form center of a tube 11 to outside in this order. The needle 9 feeds out optical fibers 5 and gel 7 to be filled around the optical fibers 5. The gel 7 is filler (waterproof material). The tip 13 and the die 15 extrusion-mold the tube 11 that is sheathed around the gel 7. Therefore, the tube 11 is molded by injecting molten resin 17 through a circular flow path 19 formed between the tip 13 and the die 15. In addition, the optical fibers 5 and the gel 7 to be accommodated within the tube 13 are fed from a cavity (portion filled with the gel) 21 into the tube 13 through the needle 9.

In order to prevent the optical fibers 5 from contacting with the tube 11 composed of molten resin (PBT resin) 17 while extruding the tube 11, some contraptions are made for bundling the optical fibers 5 at the center of the tube 11 (making a bundling diameter smaller) as much as possible and providing a layer of the gel 7 around the optical fibers 5 evenly as much as possible.

Figure 2:
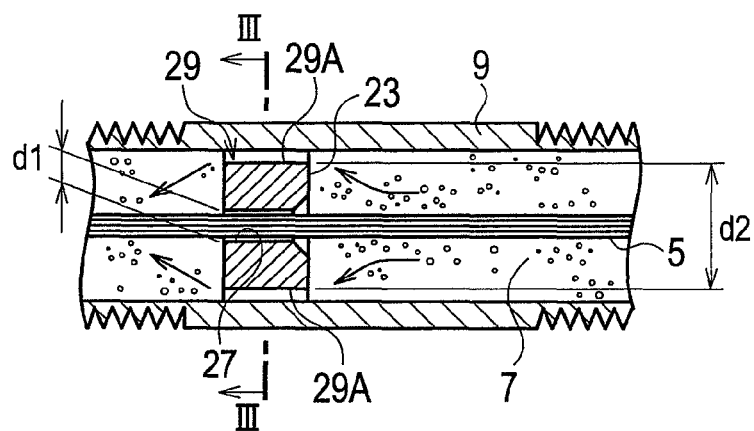
[FIG. 2] is a partially enlarged cross-sectional view of the apparatus shown in FIG. 1.
Figure 3:
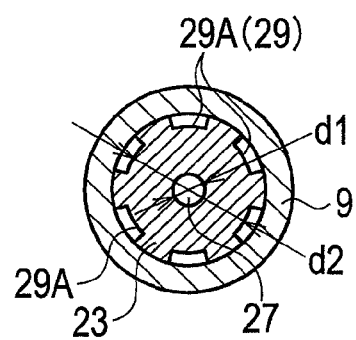
[FIG. 3] is a cross-sectional view taken along a line III-III shown in FIG. 2.

A bundling tip 23 is a cylindrical bundling member. The bundling tip 23 is provided within the needle 9 and concentrically arranged with the needle 9. As shown in FIGS. 2 and 3, a bundling hole 27 is formed at the center of the bundling tip 23. The bundling hole 27 has a diameter d1 through which at least one (twelve in the present embodiment) optical fiber 5 to be accommodated within a loose tube 25 can pass. In addition, plural slots 29A are formed on an outer circumferential surface of the bundling tip 23 along a feeding direction of the filler. The slots 29A form flow paths of the gel 7 between the bundling hole 27 and an inner circumferential surface of the needle 9. Note that, as shown in FIG. 3, an outer diameter at the bottoms of the slots 29A (twice as a distance from the center of the bundling tip 23 to the flow path 29) is d2.

The bundling tip 23 is provided so as to prevent the optical fiber 5 from contacting with the molten resin 17 to form the tube 11. Therefore, the bundling tip 23 introduces the optical fibers 5 to the center of the extruded tube 11 with a high degree of accuracy. Thus, the bundling tip 23 is provided within the needle 9 so that a distance between the bundling tip 23 and an outlet of the circular flow path 19 is made shorten as much as possible. In addition, the center of the bundling hole 27 and the center of the circular flow path 19 are aligned each other at the vicinity of the outlet of the circular flow path 19.

In addition, the flow paths 29 may be provided as through plural holes around the bundling hole 27 along the feeding direction of the filler. Alternatively, the flow paths 29 may be provided so as to take another configuration.

In the extrusion-molding apparatus 1 for a loose tube having the above-described configuration, it is not that the optical fibers are unbundled at the inlet of the cavity as disclosed in the above-mentioned Patent Documents 1 and 2, but the optical fibers 5 are introduced into the cavity 21 with bundled together. Thus contact resistance can be reduced. Furthermore, the optical fibers 5 pass through the bundling hole 27 while the optical fibers 5 and the gel 7 passing through the needle 9, so that the bundled optical fibers 5 are focused at the center of needle 9. Meanwhile, the gel 7 passes through the flow paths 29 on the bundling tip 23, so that the layer of the gel 7 is provided evenly around the bundled optical fiber 5. The optical fibers 5 and the gel 7 in this state are introduced into the tube 11, thereby the optical fibers 5 are prevented from contacting with the high-temperature tube 11 just extruded. And that the optical fibers 5 are thermally insulated due to the gel 7 existing between the optical fibers 5 and the tube 11.

Figure 4:
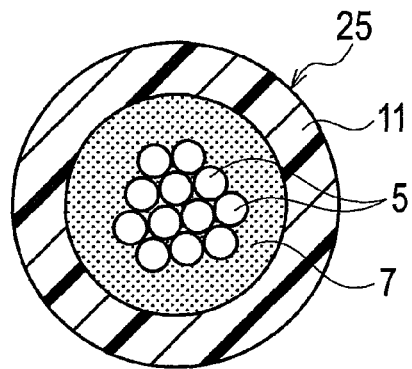
[FIG. 4] is a cross-sectional view of a loose tube taken along a line IV-IV shown in FIG. 1.

As a result, in the loose tube 25 as shown in FIG. 4, at least one optical fiber 5 is accommodated at almost the center of the tube 11 (made of thermoplastic resin such as PBT resin), and the gel (filler: waterproof material) 7 is filled around the optical fiber(s) 5 in the tube 11. Note that, in the present embodiment, an outer diameter of the tube 11 is made 2.2 mm and an inner diameter thereof is made 1.4 mm, and the twelve optical fibers 5 are accommodated therewithin.

Therefore, in this loose tube 25, at least one optical fiber 5 is held at almost the center of the tube 11. In addition, the optical fiber(s) 5 is made thermally insulated due to the gel 7 therearound, thereby achieved is a high-quality and high-density packaging structure with a small diameter and reduced transmission characteristics. The loose tube 25 can improve cable laying operations and reduce costs.

Figure 5:
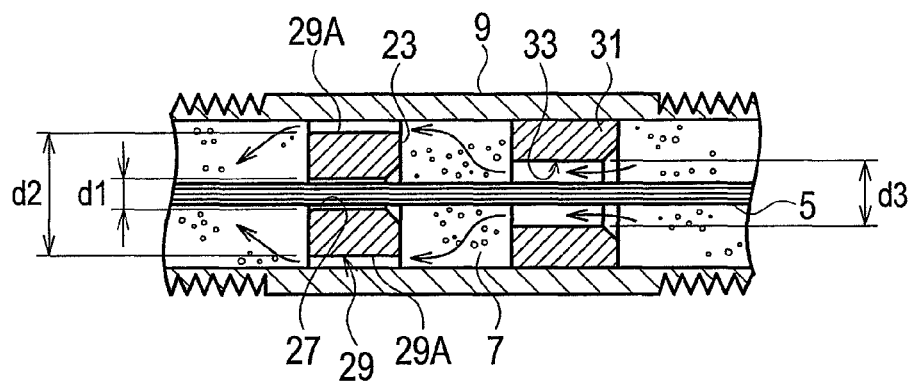
[FIG. 5] shows a second embodiment and is corresponding to FIG. 2.

As shown in FIG. 5, a guide tip 31 can be further provided within the needle 9 in addition to the above-described extrusion-molding apparatus 1 for a loose tube (a second embodiment). The guide tip 31 is located upstream of the bundling tip 23, and functions as a cylindrical guide member. The guide tip 31 is concentrically arranged with the needle 9. A guide hole 33 that has a larger diameter than that of the bundling hole 27 is formed at the center of the guide tip 31. An inner diameter d3 of the guide hole 33 is smaller than the outer diameter d2 at the bottoms of the slots 29A arranged around the outer circumferential surface of the bundling tip 23 (d3<d2).

Due to this, the optical fibers 5 fed into the needle 9 are steadily introduced into the bundling hole 27 with being guided by the guide tip 33. Further, the optical fibers 5 can be prevented from faultily entering into the flow paths 29.

Figure 6:
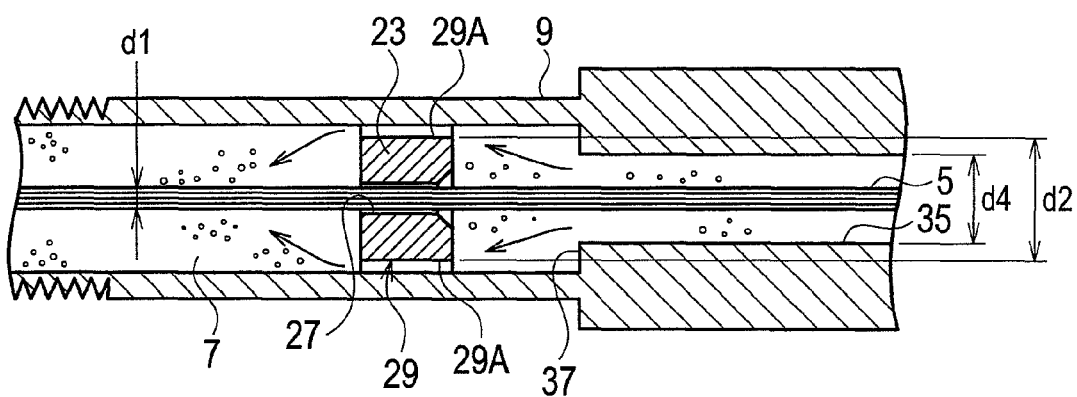
[FIG. 6] shows a third embodiment and is corresponding to FIG. 2.
Figure 7:
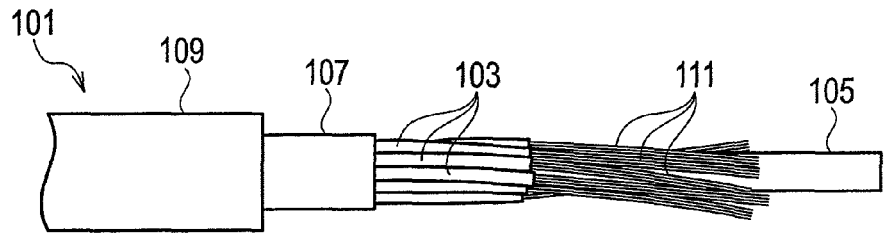
[FIG. 7] is a schematic side view of a conventional loose-tube type optical fiber cable.
Figure 8:
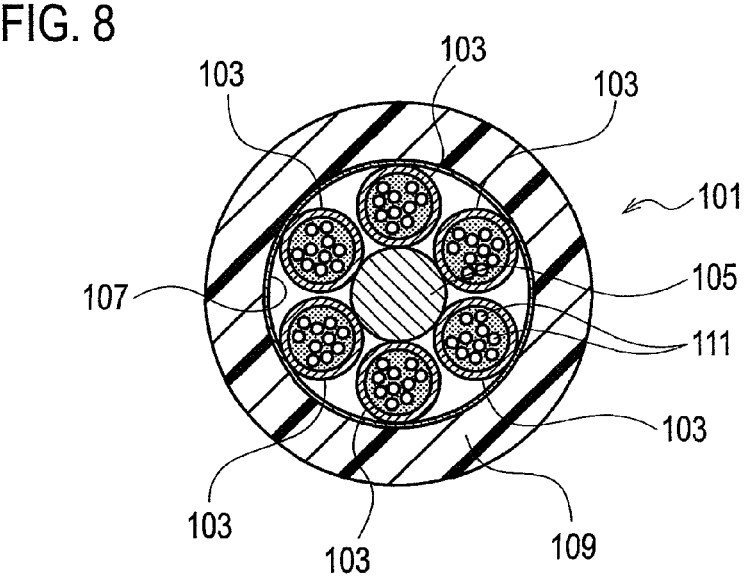
[FIG. 8] is a cross-sectional view of the cable shown in FIG. 7.
Figure 9:
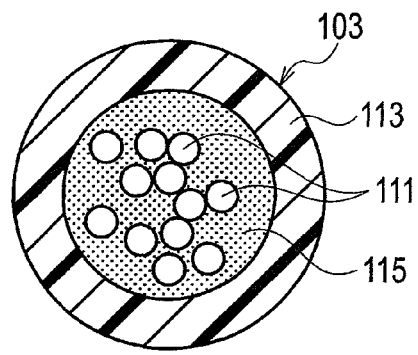
[FIG. 9] is an enlarged cross-sectional view of a loose tube shown in FIG. 8.
Figure 10:
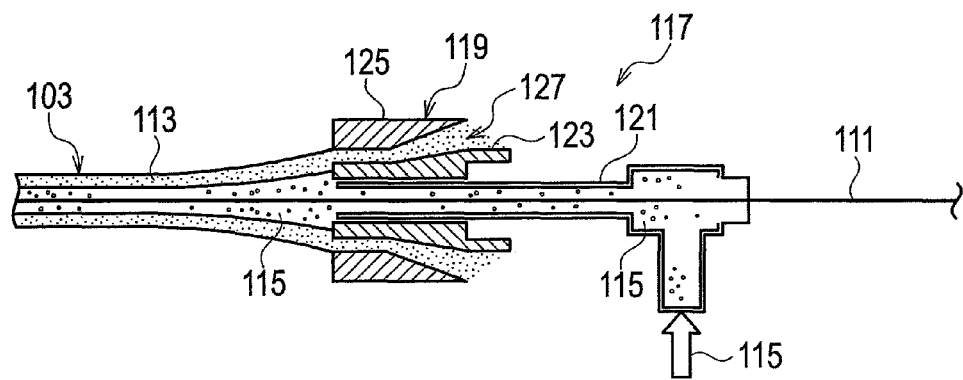
[FIG. 10] is a schematic cross-sectional view of a conventional extrusion-molding apparatus for a loose tube.
Figure 11:
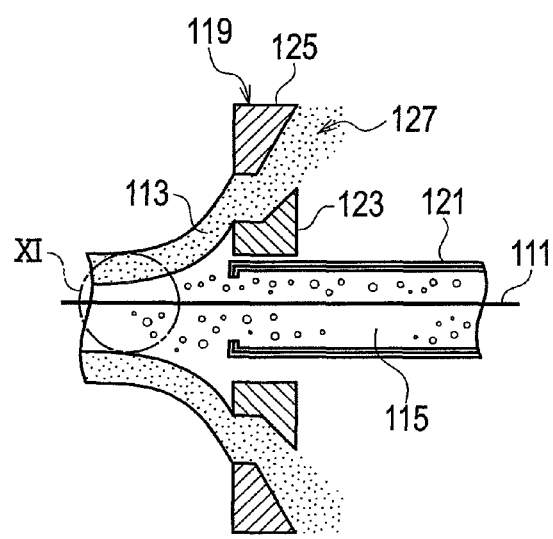
[FIG. 11] is a cross-sectional view showing a defect phenomenon in the apparatus shown in FIG. 10.
Figure 12:
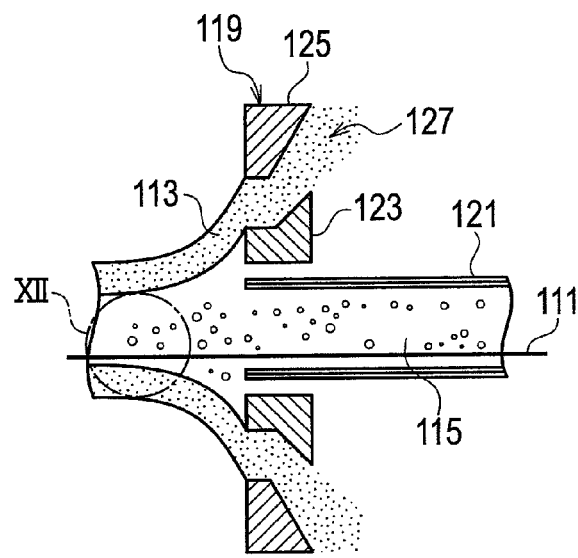
[FIG. 12] is another cross-sectional view showing the defect phenomenon in the apparatus shown in FIG. 10.
Figure 13:
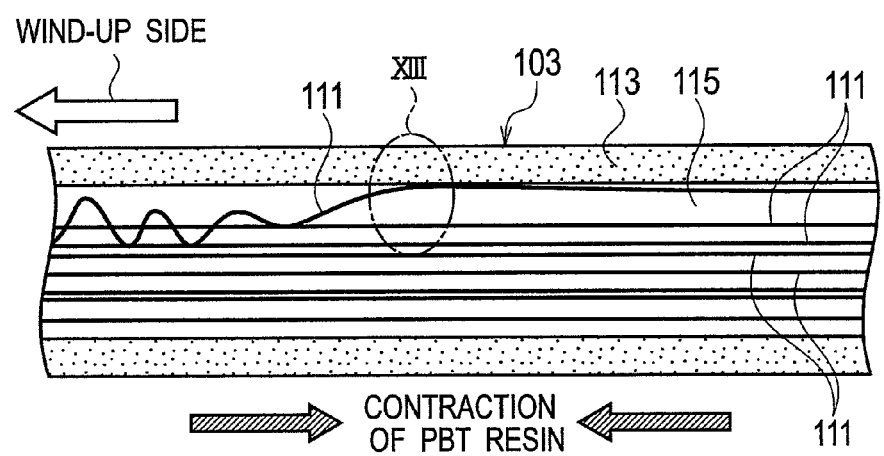
[FIG. 13] is a cross-sectional view showing a state after the tube (PBT resin) cools down and shrinks.

As shown in FIG. 6, a guide hole 35 and a step 37 can be provided on an inner wall surface of the needle 9 instead of the above-described guide tip 31 (a third embodiment). The step 37 is formed upstream of the bundling tip 23. That is, the guide hole 35 having a larger diameter than that of the bundling hole 27 is formed by the step 37. The inner diameter d4 of the guide hole 35 is smaller than the outer diameter d2 at the bottoms of the slots 29A arranged around the outer circumferential surface of the bundling tip 23 (d4<d2).

Due to this, as similarly to the case of the above-described guide tip 31, the optical fibers 5 fed into the needle 9 are steadily introduced into the bundling hole 27 with being guided by the guide hole 35.

Note that it is preferable that a distance between the bundling tip 23 and the guide tip 31 or a distance between the bundling tip 23 and the step 37 is shortened as much as possible to the extend that flowing of the gel 7 is not obstructed, in terms of preventing the optical fibers 5 from faultily entering into the flow paths 29.

Subsequently, loose tubes made by a conventional production method are used as comparative samples and the loose tubes 25 made by the above-described extrusion-molding method according to the first embodiment are used as applied samples, and transmission characteristics of the samples are measured. The measured results are shown in Table 1. Note that each name of components in the comparative samples is the same as that in the above-described embodiments.

TABLE 1

| Samples | | number of bundled Optical fibers | inner diameter of tube (mm) | inner diameter of needel (mm) | inner diameter of bundling hole (mm) | flow paths of gel | transmission charasteristics | structure |
|---|---|---|---|---|---|---|---|---|
| Comparative Samples | 1 | 12 | 1.9 | 3.0 | n/a | n/a | equal-to or less-than 0.20 dB/km | comventional |
| | 2 | 6 | 1.4 | 3.0 | n/a | n/a | equal-to or less-than 0.20 dB/km | conventional |
| | 3 | 12 | 1.4 | 3.0 | n/a | n/a | 0.36 dB/km | high-density packaging |
| | 4 | 12 | 1.4 | 3.0 | 1.3 | n/a | 0.27 dB/km | high-density packaging |
| Applied samples | 1 | 12 | 1.4 | 3.0 | 1.3 | applied | equal-to or less-than 0.20 dB/km | high-density packaging |
| | 2 | 12 | 1.4 | 3.0 | 1.4 | applied | equal-to or less-than 0.20 dB/km | high-density packaging |
| | 3 | 12 | 1.4 | 3.0 | 1.5 | applied | 0.24 dB/km | high-density packaging |

The smaller the value of the transmission characteristics is, the better. In the measurements, signal light in the wavelength 1.55 μm band is used. As will be noted from the Table 1, the inner diameter of the tube is large (1.9 mm) in the comparative sample 1, thereby the transmission characteristics value is equal-to or less-than 0.20 dB/km even with the twelve optical fibers. And, although the inner diameter of the tube is small (1.4 mm) in the comparative sample 2, the transmission characteristics value is equal-to or less-than 0.20 dB/km due to the few six optical fibers. However, the high-density packaging structure is impossible in the comparative samples 1 and 2. And, although the high-density packaging structure is made with the small inner diameter (1.4 mm) of the tube and the twelve optical fibers in the comparative sample 3, the transmission characteristics value is as high as 0.36 dB/km. And, although the high-density packaging structure is made with the small inner diameter (1.4 mm) of the tube and the twelve optical fibers in the comparative sample 4, the transmission characteristics value is lower than that in the comparative sample 3due to arrangement of the optical fibers at the center of the tube by the bundling hole. However, since there is no gel passing slot (corresponding to the flow path(s) 29) around the optical fiber, the transmission characteristics value is as high as 0.27 dB/km. As described above, a loose tube with a high-quality and high-density packaging structure that can make a diameter of the tube smaller and reduce transmission characteristics cannot be achieved by the comparative samples.

On the other hand, although the high-density packaging structure is made with the small inner diameter (1.4 mm) of the tube and the twelve optical fibers in the applied samples 1 to 3, the transmission characteristics value is restricted to 0.20 dB/km or less. However, some takes 0.24 dB/km of the transmission characteristics value in the applied sample 3. This seems to depend on the fact that the inner diameter of the bundling hole 27 is as large as 1.5 mm and larger than that in the comparative samples 1 and 2, so that it is insufficient in terms of the arrangement of the optical fibers 5 near the center of the tube 11.

In any case, in the loose tube 25 made by the extrusion-molding method according to the above-described embodiments, the optical fibers 5 are prevented form contacting with the high-temperature tube 11 while extrusion molding of the loose tube, and thermally insulated by interposing the gel 7 between the optical fibers 5 and the tube 11. Therefore, produced can be the loose tube 25 with a high-quality and high-density packaging structure that can make a diameter of the tube smaller and provide good transmission characteristics. Furthermore, by using the loose tube 25, cable laying operations can improved and costs can be reduced.

Industrial Applicability

According to the method for extrusion-molding a loose tube and the apparatus therefor of the present invention, produced can be a loose tube with a high-quality and high-density packaging structure that can make a diameter of the tube smaller and provide good transmission characteristics. Furthermore, a loose tube 25 of the present invention has a high-quality and high-density packaging structure that can make a diameter of the tube smaller, and can improve cable laying operations and reduce costs.

The invention claimed is:

1. A method for extrusion-molding a loose tube using an extrusion-molding apparatus that includes
    an extrusion head that includes a tip and a die concentrically arranged within the extrusion head and extrudes a tube between the tip and the die, and
    a needle that feeds at least one optical fiber and filler to be filled around the optical fiber into the tube being extrusion-molded,
    the method comprising:
    passing the optical fiber through a bundling hole to bundle the optical fiber at a center of the tube, the bundling hole being formed at a center of a bundling member provided within the needle and having an inner diameter smaller than an inner diameter of the tube; and
    passing the filler through a flow path to fill the filler around the optical fiber, the flow path being provided between the bundling hole and an inner circumferential surface of the needle, wherein
    a step is provided upstream of the bundling member along a feeding direction of the filler in the extrusion-molding apparatus, a guide hole being formed along a center axis of the needle by the step, being larger than the bundling hole, and having an inner diameter smaller than a length twice as a distance from the center of the bundling member to the flow path, and
    the optical fiber is introduced into the bundling hole with being guided by the guide hole.

2. The method for extrusion-molding a loose tube according to claim 1, wherein
    a cavity that is filled with the filler to be fed into the needle is provided on an upstream side of the needle, and a plurality of the optical fibers in a bundled state is introduced into the cavity and then introduced into the needle.

3. The method for extrusion-molding a loose tube according to claim 2, wherein
the bundling member is provided within the extrusion head.

4. An extrusion-molding apparatus for a loose tube comprising:
an extrusion head that includes a tip and a die concentrically arranged within the extrusion head and extrudes a tube between the tip and the die;
a needle that feeds at least one optical fiber and filler to be filled around the optical fiber into the tube being extrusion-molded;
a cylindrical bundling member provided within the needle; and
a step provided upstream of the bundling member along the feeding direction on an inner wall surface of the needle, wherein
the bundling member has a bundling hole being smaller than an inner diameter of the tube at a center of the bundling member and into which the optical fiber can pass through, and a flow path being provided along a feeding direction of the filler between the bundling hole and an inner circumferential surface of the needle, and
a guide hole is formed at a center of the step and larger than the bundling hole, and has an inner diameter smaller than a length twice as a distance from the center of the bundling member to the flow path.

5. The extrusion-molding apparatus for a loose tube according to claim 4, further comprises:
a cavity filled with the filler to be fed into the needle on an upstream side of the needle, wherein
the cavity is configured to introduce a plurality of the optical fibers in a bundled state therewithin and then feed out into the needle.

6. The extrusion-molding apparatus for a loose tube according to claim 5, wherein
the bundling member is provided within the extrusion head.

* * * * *